Figure 1:
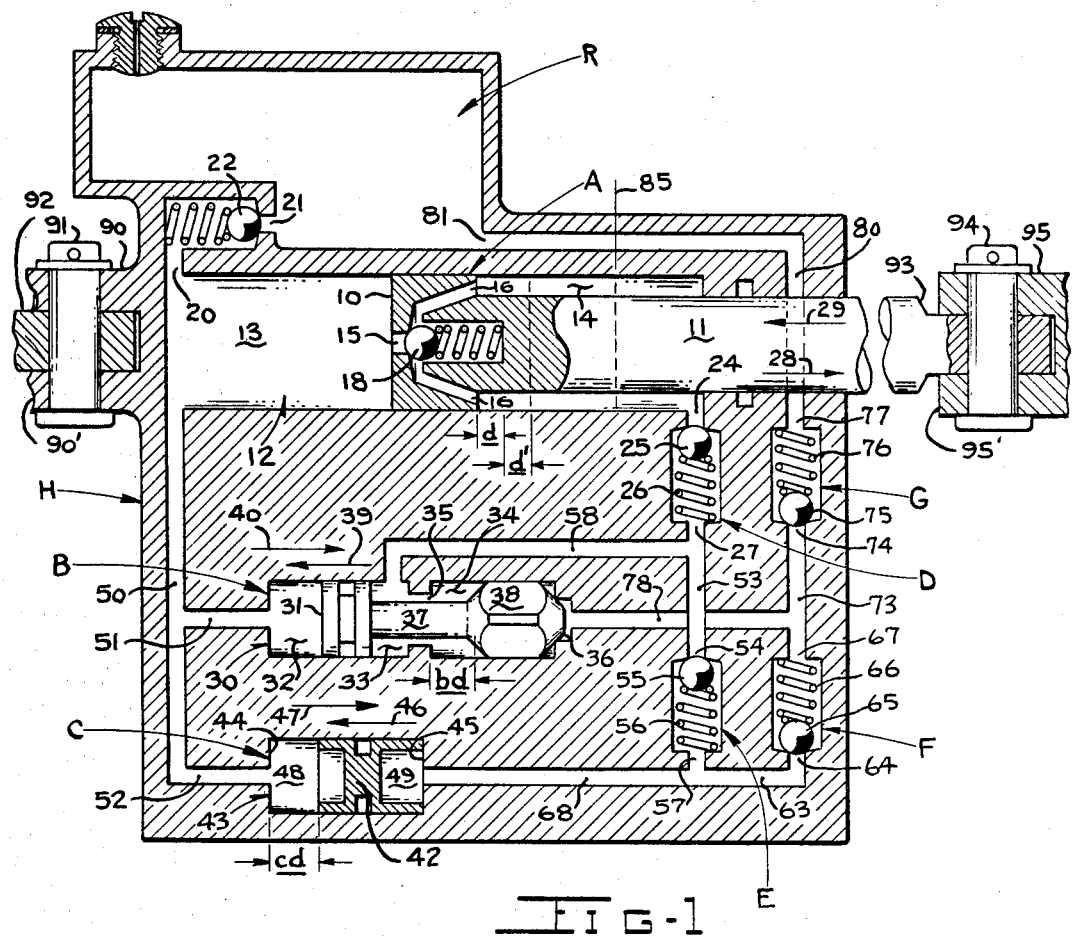

May 28, 1968

L. V. HALL ETAL 3,385,131

VIBRATION DAMPING MECHANISM

Filed Aug. 19, 1966

INVENTORS,
LELAND V. HALL AND
WILLIAM B. WESTERBURG.

BY Leslie K. Loehr

THEIR AGENT.

United States Patent Office 3,385,131
Patented May 28, 1968

3,385,131
VIBRATION DAMPING MECHANISM
Leland V. Hall, 4169 Motor Ave., Culver City, Calif. 90230, and William B. Westerburg, 3321 Poinsettia, Manhattan Beach, Calif. 90266
Filed Aug. 19, 1966, Ser. No. 573,569
10 Claims. (Cl. 74—574)

This invention relates to mechanisms for damping the vibratory movements of one body member vibrating with respect to another body member, and more particularly to hydraulic mechanisms of this type which are especially useful for damping oscillating movements of rotor blades relative to a rotor hub, occurring in the rotation plane during the rotation of an aircraft sustaining rotor.

In the art pertaining to hydraulic damping of vibrating elements, it is common practice to connect a mechanism having variable-volume compartments, such as a piston and cylinder combination, between two relatively movable members; e.g., the rotor blades and rotor hub of a helicopter, such that vibratory or oscillatory movements of a rotor blade relative to the rotor hub effects relative movements between the piston and the cylinder for producing damping forces which operate to oppose the forces involved in the vibratory or oscillatory movements of the rotor blade.

In mechanisms of this character, it is customary to provide piston-cylinder combinations having openings which are not only arranged as outlets for releasing hydraulic fluid from the cylinders in response to movements of the pistons, but such openings are made relatively small so as to restrict the outward flow of the hydraulic fluid and thereby produce fluid pressures which operate to resist piston movement and thus become the damping forces acting to oppose the forces involved in the vibratory or oscillatory movements of the rotor blades. To avoid excessive fluid-pressure build-up in the cylinders, pressure relief valves are provided for releasing hydraulic fluid when the pressure magnitude exceeds a preselected maximum. Thus, it is apparent that such mechanisms are purely pressure responsive, and any changes in the damping forces result solely from changes in the hydraulic pressures produced in the cylinders without regard to the factors causing the pressure changes. In other words, restricted openings and pressure relief valves are incapable of distinguishing between pressure changes caused by variations in amplitude and/or frequency of the rotor blade oscillatory movements. For a clear explanation of a damping mechanism of this general character, reference is made to U.S. Patent 2,604,953.

A recent improvement in the vibration damping art (see U.S. Patent 3,144,082) provides a mechanism of the above general character, in which the damping forces are controlled by means responsive to frequencies of the vibratory or oscillatory movements of a vibrating or oscillating member such that for frequencies below a predetermined number of cycles per second, the damping force is maximum, and for frequencies above a predetermined number of cycles per second, the damping force is reduced to a minimum.

Damping operation of a helicopter having a sustaining rotor with rotor blades connected to the rotor hub by lead-lag hinges, the blades are subjected to primary oscillatory movements such that the blades swing about these hinges back and forth in the plane of rotor rotation at a frequency of one per revolution of the rotor. Hence, variations in the rotational speed of the rotor causes similar variations in the frequency of the primary oscillatory movements of the blades. Moreover, each rotor blade is further subjected to secondary oscillatory movements also occurring in the plane of rotor rotation at frequencies which are not only different from the frequencies of the primary oscillatory movements, but since they occur in the same rotation plane they are superimposed on the said primary movements.

It is not unusual for secondary oscillations of the above character to be of sufficient amplitude to effect a reduction in the damping forces produced by either of the above-mentioned types of damping mechanisms, at a time when the damping forces should be such as to preclude undesirable increases in the amplitude of blade oscillations, and thus preclude a build-up of destructive forces in the blades. This undesirable reduction in the damping forces results from the fact that the pressure-responsive type and the frequency-responsive type of damping mechanisms are incapable of distinguishing between the primary and the secondary oscillatory movements of the blade.

To avoid the disturbing influence of secondary oscillations on the damping forces produced by hydraulic damping mechanisms of the above general character, the present invention contemplates such a mechanism wherein the magnitudes of the damping forces applied to an oscillating member are regulated by means responsive to the amplitudes of the oscillatory movements of the oscillating member.

Accordingly, it is a primary object of this invention to provide a hydraulic mechanism for damping or attenuating oscillatory movements of an oscillating body member, wherein the damping forces produced by the mechanism are controlled by the amplitudes of the oscillatory movements to the extent that amplitude variations result in corresponding variations in the damping forces.

It is another object to provide a hydraulic mechanism of the piston-cylinder type for producing damping forces acting in opposition to the forces involved in the oscillatory movements of one body member oscillating with respect to another body member such that the magnitudes of the damping forces are functions of the amplitudes of the oscillatory movements of the one body member.

It is another object to provide such a mechanism of the piston-cylinder type in which the piston is subjected to reciprocating movements characterized by amplitudes corresponding to the amplitudes of the oscillatory movements of the one body member.

It is also an object to provide such a mechanism in which the damping forces acting in opposition to the forces involved in the oscillatory movements of the one body member are produced by and applied directly to the piston as a result of the pressurizing action of the reciprocating piston movements on hydraulic fluid in the cylinder; and to further provide a mechanism of this character in which the pressurizing action of the piston is controlled according to the amplitudes of the piston movements to the extent that any reciprocating piston movement characterized by an amplitude falling within a preselected range of amplitudes, is opposed by pressurized liquid of a predetermined and substantially constant pressure magnitude.

It is an additional object to provide a damping mechanism of the above character in which the pressurizing action of the piston is controlled by means responsive to the amplitudes of reciprocating piston movements such that when said piston movements are characterized by amplitudes extending beyond a first preselected amplitude range, a first predetermined force operates to oppose that portion of the piston movement falling in the first amplitude range, and a second predetermined force operates to oppose that portion of piston movement extending beyond the first amplitude range.

These and other objects and advantages will become more apparent from the following description considered in connection with the accompanying drawings which illustrate the novel features of this invention for descrip-

3 tive purposes only, and which are not intended as a definition of the limits thereof.

Figure 2:
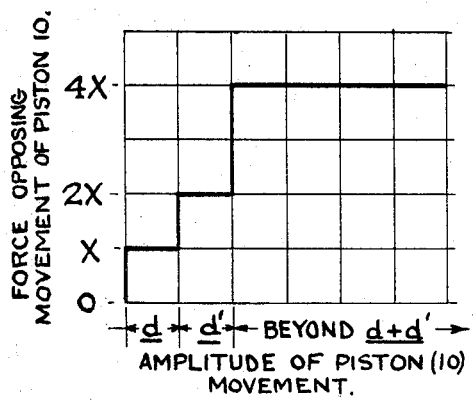

In the drawing:

FIG. 1 is a sectional view schematically illustrating a damping mechanism embodying the features of this invention; and FIG. 2 is a chart illustrating performance characteristics of the damping mechanism shown in FIG. 1.

In general, the damping mechanism shown in FIG. 1 comprises a reservoir R for holding a supply of liquid, a double acting hydraulic pump A, metering pumps B and C, and pressure release valves D, E, F, and G, all of which are liquid-conductively interconnected in functional relationship, and are schematically arranged for the sake of convenience in a unitary structure or housing H.

Double-acting pump A is a variable-stroke positive-displacement pump characterized by a piston 10 having a piston rod 11, slidably disposed in a cylinder 12 such that cylinder 12 is divided into variable-volume compartments 13 and 14. The diameter of piston rod 11 is such that the area of the piston facing compartment 14 is one-half the area of the piston facing compartment 13. A port 15 in the front face of piston 10 communicates with openings 16 in the rod side of the piston so as to provide passageways through the piston for connecting compartments 13 and 14. A check valve 18 normally closing port 15 operates to prevent any flow of liquid from compartment 14 into compartment 13, but allows liquid to flow from compartment 13 into compartment 14 whenever the pressure magnitude of liquid in compartment 13 exceeds the pressure magnitude of liquid in compartment 14.

Compartment 13 of cylinder 12 is connected to reservoir R by a passageway including an opening 20 in the wall of cylinder 12, and a port 21 in a wall of the reservoir. A check valve 22 normally closing port 21 operates to prevent any flow of liquid from compartment 13 into reservoir R, but allows liquid to flow from the reservoir into compartment 13 whenever the pressure magnitude of liquid in compartment 13 is less than the pressure magnitude of liquid in the reservoir. It should also be noted that compartment 14 is provided with an outlet port 24 normally closed by a valve element 25 of pressure release valve D which operates to open port 24 when the pressure magnitude of liquid in compartment 14 is such as to overcome the force exerted by valve spring 26.

For purposes of explaining the operation of pump A, let it be assumed that reservoir R and variable-volume compartments 13 and 14 are filled with a suitable liquid, and that piston 10 has moved a distance $d$ in the direction indicated by arrow 28; under these conditions, liquid is expelled from compartment 14 through port 24 and pressure release valve D, and at the same time, liquid from reservoir R enters compartment 13 through port 21 and opening 20. In this situation, it should be remembered that the area of piston 10, which faces compartment 13, is twice the piston area which faces compartment 14; hence, the quantity of liquid entering compartment 13 is twice the quantity of liquid expelled from compartment 14. Now, when piston 10 is again moved the distance $d$ in the direction indicated by arrow 29, liquid from compartment 13 not only enters compartment 14 via port 15 and opening 16, but the quantity of this liquid is twice the quantity of liquid expelled when piston 10 moved the distance $d$ in the direction of arrow 28; thus it follows that one half the liquid entering compartment 14 from compartment 13 is expelled outwardly through port 24 and pressure release valve D when piston 10 moves the distance $d$ in the direction indicated by arrow 29.

From the foregoing description of the operating characteristics of pump A, it should be clear that the quantity of liquid expelled through port 24 and valve D is the same for both directions of piston movement indicated by distance $d$ and arrows 28 and 29.

Metering pump B comprises a cylinder 30 slidably receiving a free piston 31 such that cylinder 30 is divided into variable-volume cylindrical chambers 32 and 33. Axially aligned with cylinder 30 is a cylindrical valve chamber 34 having an inlet port 35 communicating with cylinder 30 and an outlet port 36. A valve stem 37 extending axially from piston 31 is provided with a valve element 38 slidably received in valve chamber 34, which valve element is adapted to effect alternative closure of inlet or outlet ports 35 and 36 in response to movement of piston 31 in cylinder 30. Moreover, closure of ports 35 and 36 by valve element 38 acts as stops for limiting the distance traveled by piston 31 when it moves in the directions respectively indicated by arrows 39 and 40.

Metering pump C comprises a free piston 42 slidably received for limited axial movement in a cylinder 43 such that end-walls 44 and 45 of the cylinder constitute stops for limiting piston movements in the directions respectively indicated by arrows 46 and 47. Pump C is similar to pump B in that the volumes of spaces 48 and 49 between piston 42 and end walls 44 and 45 of cylinder 43 are variable according to the axial position of the piston in the cylinder.

Looking at the drawing, it can be seen that a liquid-conducting passageway interconnecting double-acting pump A and metering pumps B and C is provided by a duct 50 which communicates with chamber 13 of cylinder 12 and with ducts 51 and 52 which respectively communicate with chamber 32 of cylinder 30 and space 48 of cylinder 43.

Pressure release valves D and E are connected by a duct 53 extending between outlet 27 of valve D and a valve port 54 of valve E, which valve port is normally closed by means of a valve element 55 and a spring 56. Connected between duct 53 and cylinder 30 of pump B is a duct 58 which provides a passageway whereby liquid flowing from outlet 27 of valve D may enter chamber 33 of cylinder 30. It should also be noted that when inlet port 35 (pump B) is in an open condition, as illustrated in the drawing, liquid flows into valve chamber 34.

Pressure release valves E and F are connected by a duct 63 extending between outlet 57 of valve E and a valve port 64 of valve F, which valve port is normally closed by means of a valve element 65 and a spring 66. Connected between duct 63 and cylinder 43 of pump C is a duct 68 which provides a passageway such that liquid flowing from outlet 57 of valve E may enter space 49 of cylinder 43.

Pressure release valves F and G are also connected by a duct 73 extending between outlet 67 of valve F and a valve port 74 of valve G, which port is normally closed by means of a valve element 75 and spring 76. Connected between duct 73 and outlet port 36 of cylindrical valve chamber 34 (pump B) is a duct 78 which provides a passageway whereby liquid flowing from chamber 33 of cylinder 30, through chamber 34 and port 36 can flow through pressure release valve G and be returned to reservoir R by means of a duct 80 connected between an opening 81 through the wall of the reservoir and outlet 77 of valve G.

OPERATION

In describing the operation of the damping mechanism shown in FIG. 1, it is to be understood that the reservoir, and all the pumps, valves, ducts, and passageways are filled with a suitable liquid. Moreover, for purposes of this description, pressure release valves D, E, F, and G are substantially alike, in that each of the four valves are constructed to open in response to pressurized liquid of a pressure magnitude exceeding a predetermined value. For instance, if valve D opens when the pressure magnitude of the liquid in compartment 14 of cylinder 12 (pump A) exceeds a unit pressure of 100 pounds per square inch, then valves E, F, and G will also open when the unit pressure of pressurized liquid in ducts 53, 63, and 73 exceeds a unit pressure of 100 pounds per square inch. However, it should be noted that valves D, E, F, and G may be designed to open at different unit pressures according to particular requirements.

It is also pointed out that, when pressure release valves of the character of valves D through G are connected in series, the total resistance to be overcome by pressurized liquid from a suitable source thereof, equals the sum of the resistances of the serially connected valves. For example, more valves D, E, F, and G open at unit pressures of 100 pounds per square inch, the unit pressure of liquid in compartment 14 must be at least 100 pounds to open valve D; and to open valve E, the unit liquid pressure in duct 53 must also be at least 100 pounds. However, it should be noted that the pressure of the liquid in duct 53 is added to the force applied by spring 26 to valve element 25; therefore, to open valve E, the unit pressure of the liquid in compartment 14 must be at least 200 pounds. Moreover, when the liquid pressure in duct 63 is 100 pounds per square inch for opening valve F, the pressures in duct 53 and in compartment 14 must be at least 200 and 300 pounds, respectively. The same is true with respect to valve G; i.e., when the unit pressure of the liquid in duct 73 is 100 pounds, the unit liquid pressures in duct 63, duct 53, and compartment 14 must be at least 200, 300, and 400 pounds, respectively.

As previously indicated, the reservoir and all the pumps, valves, ducts and passageways are filled with suitable liquid. Moreover, it is assumed that valves D, E, F, and G are constructed to open at unit pressures of at least 100 pounds per square inch. Thus, when piston 10 of pump A begins to move in the direction indicated by arrow 28, the volume of compartment 14 decreases in proportion to the extent of piston-movement, which in turn, causes an increase in the pressure of the liquid in compartment 14 to at least 100 p.s.i., so that valve D opens and allows liquid to flow through outlet 27 into duct 53. Accompanying the decrease in the volume of compartment 14, is an increase in the volume of compartment 13 and a corresponding reduction in the unit pressure of the liquid in compartment 13; hence, chamber 32 of cylinder 30 (metering pump B) and ducts 50 and 51, all of which communicate with compartment 13, are low-pressure regions. Therefore, liquid from compartment 14 flowing through outlet 27 of valve D and duct 58 into chamber 53, can easily effect movement of piston 31 (pump B) in the direction indicated by arrow 39. The extent of the movement of piston 31 in the direction of arrow 39 is proportional to the movement of piston 10 (pump A) to the degree that when piston 10 has moved a first distance $d$, sufficient liquid from compartment 14 will have entered chamber 33 of cylinder 30 via valve D and duct 58 to cause movement of piston 31 such that valve element 38 has moved a distance $bd$ and effected closure of inlet port 35 of valve chamber 34.

It was previosuly explained that the closing of port 35 by valve element 38 also acted as a stop to prevent further movement of piston 31 in the direction indicated by arrow 39, thus the flow of liquid through valve D and duct 58 is effectively blocked. When the flow of liquid from pump A is blocked by this action of metering pump B, further movement of piston 10 in the direction of arrow 28 will cause an instantaneous increase in the unit pressure of the pressurized liquid in compartment 14 of cylinder 12 and in duct 53 to the extent that the pressure of the liquid in compartment 14 is at least 200 p.s.i., and the pressure of the liquid in duct 53 is at least 100 p.s.i., so that valve E opens and allows liquid to flow through outlet 57 into duct 63.

As long as piston 10 continues its movement in the direction indicated by arrow 28, compartment 13 of the pump A cylinder, chamber 32 of the pump B cylinder, space 48 of the pump C cylinder, and ducts 50, 51, and 52 continue to be low-pressure regions; therefore, liquid from compartment 14 flowing through valve D, duct 53, valve E, and duct 68 into space 49 of the pump C cylinder 43, can easily effect movement of piston 42 in the direction indicated by arrow 46. As was the case with metering pump B, the extent of the movement of piston 42 in the direction of arrow 46 is proportional to the movement of piston 10 to the degree that when piston 10 has moved an additional second distance $d'$, sufficient liquid from compartment 14 will have entered space 49 of cylinder 43 via valve D, duct 53, valve E and duct 68 to cause movement of piston 42 a distance $cd$ from its stopped position against cylinder end wall 45 to a stopped position against cylinder end wall 44.

Once piston 42 of metering pump C has moved the distance $cd$ to a stopped position, the flow of liquid through duct 68 is effectively blocked; whereupon, further movement of piston 10 in the direction of arrow 28 beyond the distance of $d$ plus $d'$ will cause an instantaneous increase in the unit pressures of the pressurized liquid in compartment 14 of cylinder 12, duct 53, and duct 63 to the extent that the pressure of the liquid in compartment 14 is at least 300 p.s.i., and the pressures in ducts 53 and 63 are at least 200 p.s.i., and 100 p.s.i., respectively, so that valve F opens and liquid could flow through outlet 67 into duct 73 except for the fact that duct 73 is blocked by valve G and duct 78 is effectively blocked by the closure of port 35; in other words, there is no passageway for conducting liquid away from valve outlet 67. The end result of this condition is an automatic increase in the unit pressure of the liquid in compartment 14 to at least 400 p.s.i., and increases in the pressures of the liquid in ducts 53, 63, and 73 to at least 300 p.s.i.; 200 p.s.i., and 100 p.s.i., respectively, so that valve G opens and liquid returns to reservoir R via opening 81, duct 80, and the valve G.

Let it be assumed that piston 10 of pump A has continued its movement in the direction of arrow 28 to the dotted line position where the rod-side of the piston is stopped at line 85, and that piston 10 has started to move in the direction indicated by arrow 29. Now, since all passageways for conducting liquid from compartments 13 and 14 via ducts 50, 51, 52, and port 24 are effectively blocked by pistons 31 and 42 and valve D, this reversal of piston movement causes an increase in the unit pressure of the liquid in compartment 13, such that liquid not only flows into compartment 14 as previously explained in the description of pump A, but it also flows into chamber 32 of cylinder 30 and causes piston 31 to move in the direction indicated by arrow 40. The result of this movement of piston 31 causes the opening of port 35 and, at the same time, pressurizes the liquid in chamber 33 of cylinder 30, ducts 58 and 53, valve chamber 34, and ducts 78 and 73.

A close examination of piston 31, valve stem 37, and valve element 38 will show that the effective area of piston 31 facing chamber 33 of cylinder 30, is equal to the piston area facing cylindrical chamber 32; hence, the unit pressure of the pressurized liquid in the chamber 33, ducts 58 and 53, chamber 34, and ducts 78 and 73 is not only the same as the unit pressure of the liquid in the chamber 32, ducts 51 and 50, and compartment 13 of cylinder 12, but, when the magnitude of this unit pressure is at least 100 p.s.i., valve G will respond to the pressurized liquid in duct 73 and open port 74 and allow liquid to return to a reservoir R through valve G, duct 80 and opening 81. Moreover, the quantity of liquid returned to the reservoir by metering pump B is directly proportional to the movement of piston 10 in the direction of arrow 29. For example, when piston 10 of pump A has moved as indicated by arrow 29 a first distance $d'$ which is equal to distance $d$, sufficient liquid from compartment 13 has entered ducts 50 and 51 to effect movement of piston 31 and valve element 38 the distance $bd$ in the direction of arrow 40 such that a quantity of liquid equal to the quantity of liquid previously involved in moving piston 31 the distance $bd$ in the direction of arrow 39 is returned to the reservoir, and such that valve element 38 has effected closure of outlet port 36.

It should be noted that, although the unit pressures of the liquid in compartment 14 and in ducts 53 and 73 are substantially equal when piston 10 is moving the distance $d'$ in the direction of arrow 29, valve D will not respond to pressure in compartment 14 because the pressure of the liquid in duct 53 is added to the force applied by spring 26 to the valve element 25 of valve D. It is also to be noted that, when piston 10 is moving the distance $d'$ according to arrow 29, and piston 42 of metering pump C is in its stopped position against end wall 44 of cylinder 43, the unit pressure of the liquid in ducts 50 and 52 is transmitted by piston 42 to the liquid in ducts 68 and 63 such that unit pressures of the liquid in the latter ducts are not only equal to each other, but they are substantially the same as the unit pressures of the liquid in ducts 53 and 73. This transmission of pressure by 42 is effected without appreciable movement of the piston because valve F will not respond to the pressure in duct 63 since the pressure in duct 73 is added to the force applied by spring 66 to valve element 65 of the valve F. Moreover, the unit pressures of the liquid in ducts 58 and 53 are the same as the pressures in ducts 68 and 63, hence, valve E will not respond to the pressure in duct 53 because the pressure in duct 63 is added to the force applied by spring 56 to valve element 55 of the valve E.

It should now be evident that, when piston 31 and valve element 38 of metering pump B have moved to their stopped position where the element 38 has effected closure of port 36, the flow of liquid into the chamber 32 of pump B abruptly ceases, and that further movement of piston 10 in the direction of arrow 29 will cause an instantaneous increase in the unit pressure of the liquid in compartment 13, ducts 50, 51, and 52, and space 48 of metering pump C, which pressure increase is effectively transmitted through piston 42 to the liquid in space 49, and in ducts 68 and 63 such that when the increased unit pressure attains a magnitude of at least 200 p.s.i., the serially connected valves F and G will open; whereupon, piston 42 will move in the direction of arrow 47 and effect the return of liquid to reservoir R via valve G, duct 80 and opening 81. The quantity of liquid returned to the reservoir in this manner by metering pump C is directly proportional to the movement of piston 10 in the direction indicated by arrow 29. For example, when piston 10 of pump A has moved as indicated by arrow 29, an additional second distance $d$ sufficient liquid from compartment 13 has entered ducts 50 and 52 and space 48 to cause movement of piston 42 in the direction of arrow 47 such that a quantity of liquid equal to the quantity of liquid previously involved in moving the piston 42 the distance $cd$ in the direction of arrow 46 is returned to the reservoir.

Once piston 42 of the metering pump C has moved the distance $cd$ to a stopped position against cylinder end wall 45, duct 52 is effectively blocked; therefore, continued movement of the pump A piston 10 in the direction of arrow 29 beyond the distance of $d'$ plus $d$ will cause a instantaneous increase in the unit pressure of the liquid in compartment 13 such that liquid will not only be transferred to compartment 14, but the unit pressures of the liquid in both of said compartments will be the same. Moreover, when these unit pressures have attained a magnitude of 400 p.s.i., the serially connected valves D, E, F, and G will open as previously explained, and liquid will be returned to reservoir R via valve G, duct 80, and opening 81.

From the foregoing description of the functional relationships between double acting pump A, metering pumps B and C, and pressure release valves D, E, F, and G, the following conditions should now be apparent:

(1) Once piston 10 of pump A begins to move in either direction indicated by arrows 28 and 29, the moving piston 10 effects production of a predetermined first-stage force resulting from pressurized liquid at a first unit pressure of 100 p.s.i., such that for a preselected first-stage movement of piston 10 in cylinder 12 a maximum distance $d$ or any portion thereof, the first-stage force is effective for opposing such piston movement.

(2) When movement of piston 10 is continued beyond the distance $d$, the moving piston effects production of a predetermined second-stage force resulting from pressurized liquid at a second unit pressure of 200 p.s.i., such that for an additional preselected second-stage movement of piston 10 in cylinder 12 a maximum distance $d'$ or any portion thereof, the second-stage force is effective for opposing such additional piston movement.

(3) When movement of piston 10 is continued beyond the distance of $d$ plus $d'$, the moving piston effects production of a predetermined third-stage force resulting from pressurized liquid at a third unit pressure of 400 p.s.i., such that for any third-stage movement of piston 10 beyond the distance of $d$ plus $d'$, the third-stage force is effective for opposing such piston movement.

(4) Valves D, E, F, and G operate individually and collectively to control the pressurizing effect of the moving piston 10 on liquid in compartments 13 and 14 of the pump A.

(5) The metering pumps B and C respond to pressurized liquid from compartments 13 and 14 of the pump A for establishing the first, second and third stages of piston 10 movement, and for affecting the operating sequence of the valves D, E, F, and G such that the first, second, and third-stage forces are respectively effective for opposing movements of piston 10 during all or any portion of the first, second, and third stages of said piston 10 movements.

A chart representative of the above-stated conditions 1, 2, and 3 is shown in FIG. 2, where X represents a first-stage force acting in opposition to first-stage movements of piston 10 occurring in the range of distance $d$; 2X represents a second-stage force acting in opposition to second-stage piston movements occurring in the range of distance $d'$; and 4X represents a third-stage force acting in opposition to third-stage movements of piston 10 occurring beyond the range of distance $d$ plus $d'$. Stated differently, when the amplitude of piston 10 movement is in the range of distance $d$, the force acting in opposition to piston movement is X; and when the amplitude of piston 10 movement is greater than the range of distance $d$ but not greater than the range of $d$ plus $d'$, movement of the piston is opposed by the force X for the distance $d$, and by the force 2X for all or any portion of the distance $d'$; and further, when the amplitude of piston 10 movement exceeds the distance of $d$ plus $d'$, movement of piston 10 is opposed by force X for distance $d$, force 2X for distance $d'$, and force 4X for any movement beyond the distance of $d$ plus $d'$.

Inasmuch as the damping mechanism in FIG. 1 is designed for damping vibratory or oscillatory movements of one body member with respect to another body member, it is to be noted that housing H is provided with lugs 90 and 90' adapted for connection by means of pin 91 to a first body member 92 such as the rotor hub (not shown) of an aircraft sustaining rotor; and that piston rod 11 is provided with an end portion 93 constructed for connection by means of a pin 94 to lugs 95 and 95' of a second body member such as a rotor blade (not shown) of the aircraft sustaining rotor. Thus, it should be evident that when the damping mechanism is connected between a rotor blade and a rotor hub as suggested above, oscillatory or vibratory movements of the rotor blade occurring with respect to the rotor hub in the plane of rotor rotation, will be effectively opposed by forces produced and controlled according to the amplitudes of said oscillating movements.

Although the terms 100 p.s.i., 200 p.s.i., and 400 p.s.i., have been used in describing operating features of valves D, E, F, and G, it is to be understood that valves of this general type are well-known and may be constructed to open in response to pressurized liquid of any desired pressure magnitude. Moreover, each of the four valves may be designed to open in response to unit pressures of different magnitude. Thus, damping mechanisms constructed according to the present invention can be provided to solve a wide range of vibration-damping problems.

What is claimed as new is:

1. In an apparatus having first and second body members interconnected such that oscillatory movements of one body member can occur with respect to the other body member, and a damping mechanism for producing damping forces acting in opposition to oscillatory movements of the one body member such that damping forces of a predetermined magnitude act in opposition to any oscillatory movement having an amplitude falling within a preselected range of amplitudes, said damping mechanism comprising:

(A) a source of liquid;

(B) pump means having liquid-filled variable-volume first and second compartments of a character such that a decrease in the volume of one compartment causes a corresponding increase in the volume of the other compartment for affecting the pressurized condition of the liquid in said compartments, said pump means being interconnected between the first and second body members such that oscillatory movements of one body member occurring with respect to the other body member cause variations in the volumes of said compartments such that said volume variations correspond to the amplitudes of said oscillatory movements, and the pressurizing effect of said volume variations on the liquid in said compartments produces damping forces acting in opposition to the oscillatory movements of said one body member;

(C) first liquid-conducting means connecting the source of liquid and the first compartment of the pump means such that liquid is conducted from the source into the first compartment when the pressure magnitude of the liquid in said compartment is less than the pressure magnitude of the liquid in said source;

(D) second liquid-conducting means connecting the first and second compartments of the pump means such that liquid is conducted from said first compartment into said second compartment when the pressure magnitude of the liquid in said second compartment is less than the pressure magnitude of the liquid in said first compartment;

(E) a mechanism responsive to compartment volume variations of the pump means for establishing a preselected range of amplitudes for the one body member oscillatory movements, said mechanism comprising metering means having variable-volume first and second chambers of a character such that an increase in the volume of one chamber causes a corresponding decrease in the volume of the other chamber;

(F) third liquid-conducting means connecting said metering means to the pump means and the source of liquid such that variations in the volumes of the first and second compartments of said pump means are effective for transferring liquid from said compartments into the first and second chambers of the metering means for causing corresponding variations in the volumes of said chambers such that transferring liquid from said first compartment into said first chamber is effective for transferring liquid from said second chamber into said source of liquid, said third liquid-conducting means including a first passageway interconnecting the pump means first compartment and the metering means first chamber, a second passageway connecting the pump means second compartment to the second chamber of the metering means, and a third passageway connecting said metering means second chamber to the source of liquid;

said metering means being so constructed and arranged that the capacities of the variable-volume first and second chambers are limited to preselected maximums such that preselected variations in the volumes of the first and second compartments of the pump means are required for filling said chambers with liquid to said preselected maximum capacities, and said preselected variations in the volumes of said first and second compartments being effective for establishing the preselected range of amplitudes for oscillatory movements of the one body member; and (G) pressure-responsive means associated with the pump means, the metering means, and the source of liquid for establishing the predetermined magnitude of the forces acting in opposition to one body member oscillatory movements having amplitudes falling within said preselected range of amplitudes, said pressure responsive means including a plurality of valve means associated with the third liquid-conducting means for effecting a closed condition of the second passageway to liquid in the second chamber of the metering means and an open condition of said second passageway to liquid in the second compartment of the pump means when the pressurized condition of said second-compartment liquid exceeds a predetermined first pressure magnitude, and for effecting a closed condition of the third passageway to liquid in the source of liquid and an open condition of said third passageway to metering means second-chamber liquid when the pressurized condition of said second-chamber liquid exceeds a predetermined second pressure magnitude.

2. The combination defined in claim 1 in which the metering means of the mechanism for establishing preselected range of amplitudes for the one body member oscillatory movements includes a metering pump characterized by a cylinder receiving a movable free piston dividing the cylinder into variable-volume first and second cylindrical chambers such that axial movement of the piston in either direction in the cylinder causes variations in the volumes of said chambers such that an increase in the volume of one chamber results in a corresponding decrease in the volume of the other chamber.

3. The combination defined in claim 2 in which the third liquid-conducting means is constructed and arranged such that the first compartment of the pump means and the first chamber of the metering pump are interconnected by the first passageway, and such that the second compartment of said pump means and the second chamber of said metering pump are connected by the second passageway, and such that said metering-pump second chamber is connected to the source of liquid by the third passageway.

4. The combination defined in claim 3 in which the plurality of valve means of the pressure-responsive means comprises spring-biased normally-closed pressure-release valves operatively disposed in the second and third passageways of the third liquid-conducting means such that said pressure-release valves are individually and serially responsive to pressurized liquid in the second compartment of the pump means such that liquid from said second compartment is caused to enter the second chamber of the metering pump when the pressurized condition of the second-compartment liquid exceeds a predetermined first pressure magnitude, and is caused to enter the source of liquid when the pressurized condition of said liquid exceeds a predetermined second pressure magnitude.

5. The combination defined in claim 1 in which the metering means of the mechanism for establishing preselected range of amplitudes for the one body member oscillatory movements comprises first and second metering pumps characterized by cylinders receiving movable free pistons dividing the cylinders into variable-volume first and second chambers such that axial movements of the pistons in either direction in the cylinders cause variations in the volumes of said chambers such that an increase in the volume of one chamber in each cylinder results in a corresponding decrease in the volume of the other chamber in said each cylinder; said first and second metering pumps being responsive to volume variations of the first and second compartments of the pump means for respectively establishing preselected first and second amplitude ranges for the oscillatory movements of the one body member.

6. The combination according to claim 5 in which the third-liquid conducting means is constructed and arranged such that the first compartment of the pump means and the first chambers of said metering pumps are interconnected by the first passageway, and such that the second compartment of said pump means and the second chambers of said metering pumps are connected by the second passageway, and such that the second chambers of the said metering pumps are connected to the source of liquid by the third passageway.

7. The combination according to claim 6 in which the first metering pump is characterized by a valve mechanism comprising:

a valve chamber having communicating inlet and outlet ports and port-closing means, said valve chamber being interposed between the metering pump cylinder and the third passageway of the third liquid-conducting means such that the inlet port is connected to the second chamber of said cylinder and the outlet port is connected to said third passageway for conducting liquid from said second chamber to the source of liquid via said valve chamber;

said valve chamber, said inlet and outlet ports, and said port-closing means being so constructed and arranged that said port-closing means is effective for causing closed and open conditions of the inlet and outlet ports such that movement of the port closing means a predetermined distance effects an open condition of one port and a closed condition of the other port for effecting a closed condition of the third passageway to liquid in the second chamber of said one metering-pump cylinder, and such that movement of said port-closing means a distance less than said predetermined distance effects open conditions of both of said ports for effecting an open condition of the third passageway to liquid in said one metering pump second chamber;

said port-closing means and the free piston of said one metering pump being so connected that movement of said piston causes movement of said port-closing means such that closing one of the ports by the port-closing means is effective for limiting axial movement of the piston in one direction, and closing the other of said ports by said port-closing means is effective for limiting axial movement of said piston in the other direction, and such that movement of said piston by liquid in the first chamber of the one metering pump is effective for moving liquid from the second chamber of said metering pump through the valve chamber into the third passageway until the port-closing means has effected closure of the outer port; and said movement-limiting action of the port-closing means on axial movements of the free piston of the one metering pump being effective for limiting the capacities of the first and second chambers of said one metering pump such that said chambers are provided with preselected maximum capacities.

8. The combination according to claim 7 in which the plurality of valve means of the pressure-responsive means includes spring-biased normally-closed first and second valves having substantially identical operating characteristics such that each valve opens in response to pressurized liquid of a predetermined first pressure magnitude, said valves being associated with the third liquid-conducting means such that the normally-closed first valve is disposed in the second passageway between the second compartment of the pump means and the second chamber of the first metering pump for effecting a closed condition of said second passageway to liquid in said second chamber, and for effecting an open condition of said second passageway to pressurized liquid in said pump-means second compartment such that liquid from said second compartment enters said second chamber when the pressure of the second-compartment liquid exceeds the predetermined first pressure magnitude; and such that the normally-closed second valve is disposed in the third passageway between the source of liquid and the valve-chamber outlet port of the valve mechanism for effecting a closed condition of said third passageway to liquid in the source of liquid, and for effecting an open condition of said third passageway such that liquid from the second chamber of the first metering pump flows into the source of liquid when the pressure of the second chamber liquid exceeds the predetermined first pressure magnitude;

said normally-closed first and second valves being effective for establishing the predetermined magnitude of the forces acting in opposition to one body member oscillatory movements having amplitudes falling within the preselected first amplitude range.

9. The combination according to claim 8 in which the cylinder of the second metering pump is provided with end walls constructed and arranged for limiting axial movement of the piston in the cylinder such that the variable-volume first and second chambers are limited to preselected maximum capacities.

10. The combination according to claim 9 in which the plurality of valve means of the pressure-responsive means further includes spring-biased normally-closed third and fourth valves having substantially identical operating characteristics such that each valve opens in response to pressurized liquid of a predetermined second pressure magnitude, said valves being associated with the third liquid-conducting means such that the normally closed third valve is disposed in the second passageway between the normally-closed first valve and the second chamber of the second metering pump for effecting a closed condition of said second passageway to liquid in said second chamber, and for cooperating with said first valve for effecting an open condition of said second passageway to pressurized liquid in the second compartment of the pump means such that liquid from said second compartment enters the second chamber of said second metering pump when the pressure of the second-compartment liquid exceeds a pressure magnitude equal to the sum of the predetermined first and second pressure magnitudes required for opening the normally-closed first and third valves; and such that the normally-closed fourth valve is disposed in the third passageway between the normally-closed second valve and the second chamber of the second metering pump for effecting a closed condition of the third passageway with respect to the second chamber of said second metering pump such that liquid in said third passageway is prevented from entering said second chamber, said fourth valve cooperating with the normally-closed second valve for effecting an open condition of the third passageway in response to pressurized liquid in the second chamber of the second metering pump such that liquid from said second chamber flows into the source of liquid when the pressure of the second-chamber liquid exceeds a pressure magnitude equal to the sum of the predetermined first and second pressure magnitudes required for opening the normally-closed second and fourth valves;

the cooperation between the normally-closed first and third valves, and between the normally-closed second and fourth valves being effective for establishing the predetermined magnitude of the forces acting in opposition to one body oscillatory movements having amplitudes falling within the preselected second amplitude range.

References Cited

UNITED STATES PATENTS 3,144,082  8/1964  Grant et al. _____ 170—160.55

FRED C. MATTERN, JR., *Primary Examiner.*

J. S. CORNETTE, *Assistant Examiner.*